May 12, 1959  S. A. BUTERA  2,885,994
VISUAL AID FOR DIAL TYPE MEASURING INSTRUMENT
Filed Nov. 14, 1957  2 Sheets-Sheet 1

INVENTOR.
SAM A. BUTERA
BY Hudson, Boughton,
Williams, David & Hoffman
ATTORNEYS May 12, 1959 S. A. BUTERA 2,885,994
VISUAL AID FOR DIAL TYPE MEASURING INSTRUMENT
Filed Nov. 14, 1957 2 Sheets-Sheet 2

INVENTOR.
SAM A. BUTERA
BY
ATTORNEYS

United States Patent Office 2,885,994
Patented May 12, 1959

2,885,994
VISUAL AID FOR DIAL TYPE MEASURING INSTRUMENT

Sam A. Butera, Cleveland, Ohio

Application November 14, 1957, Serial No. 696,440

2 Claims. (Cl. 116—133)

The present invention relates to visual aids for use in connection with a dial type measuring instrument, and more particularly in connection with dial indicator gauges of the type commonly used for the gauging of linear dimensions.

More specifically, the present invention relates to a setting indicator for use as a visual aid in connection with calibrating or setting a dial indicator gauge adapted to directly indicate the difference between a dimension of a workpiece and that of a measured object having a known rectilinear dimension.

Heretofore there has been a considerable amount of difficulty in accurately calibrating a measuring instrument, especially of the dial indicator type, whereby any error results in a high percentage of workpieces being discarded as unacceptable. Ordinarily a dial type indicator or like measuring instrument is initially adjusted in accordance with a master gauge block or master workpiece and the movable dial indicator face is rotated a certain amount, so that the zero setting is in accordance with the desired mean dimension. Thereupon, the tolerance relative to the desired mean dimension is either mentally noted by the operator or noted directly upon the face of the crystal of the dial indicator gauge. Thus, the precise dimension is indicated at the zero marker on the face of the gauge and the upper and lower limits denoting the tolerance relative to the zero marker are visually available on the face of the gauge.

Although the above outline of operation for calibrating or setting a dial indicator gauge appears to be quite simple and involves only a few steps, a problem has arisen because human errors have resulted in a large number of workpieces being rejected and discarded as scrap, representing a waste of material and labor. The costly mistakes of the operator are virtually eliminated by the use of the present invention.

It is an object of this invention to provide a visual aid in the form of a setting indicator for use with a dial type measuring indicator gauge of the type commonly used for the gauging of linear dimensions.

Another object of this invention is to provide a disk-type setting indicator for use in connection with dial type measuring instruments whereby the lower and higher limits are denoted by the use of swingable limit tabs or arms.

A further object of this invention is to provide visual aid in the form of a disk-type setting indicator whereupon pertinent information relating to a specific workpiece dimension can be noted directly upon the setting indicator and the various movable arms of the setting indicator can be permanently established and thereupon be available for future reference.

A further object of this invention is to provide a visual aid in the form of a small and compact disk-type setting indicator for use in connection with dial type measuring instruments of the class described which can be constructed at low cost and without difficulty of fabrication.

A further object of this invention is to provide a visual aid in the form of a disk-type setting indicator which can be used where close tolerances are required.

A further object of this invention is to provide a visual aid in the form of a disk-type setting indicator having swingable tabs which can be moved inwardly and outwardly in a radial direction.

A further object of this invention is to provide a visual aid in the form of a disk-type setting indicator provided with swingable and radially movable tabs so that the indicator can be used for indicating close or minute tolerances of external dimensions and also can be used for indicating close or minute tolerances of internal dimensions.

The foregoing and other objects and advantages of the present invention will appear from the following disclosure and appended claims, when considered in connection with the accompanying drawings which form a part of this specification and wherein like reference characters designate corresponding parts in several views of the drawing.

In the drawing:

Fig. 1 discloses a plan view of a disk-type setting indicator for use in connection with dial type measuring instruments;

Before going into detail of the present invention, it is to be understood that the invention is not limited in its application to the details and arrangements of parts illustrated in the accompanying drawings, since the invention is capable of other embodiments and of being practiced or carried out in various ways. It should be understood, also, that the phraseology or terminology employed herein is for the purpose of description and not of limitation; and it is not intended to limit the invention claimed beyond the requirements of the prior art.

Figure 1:
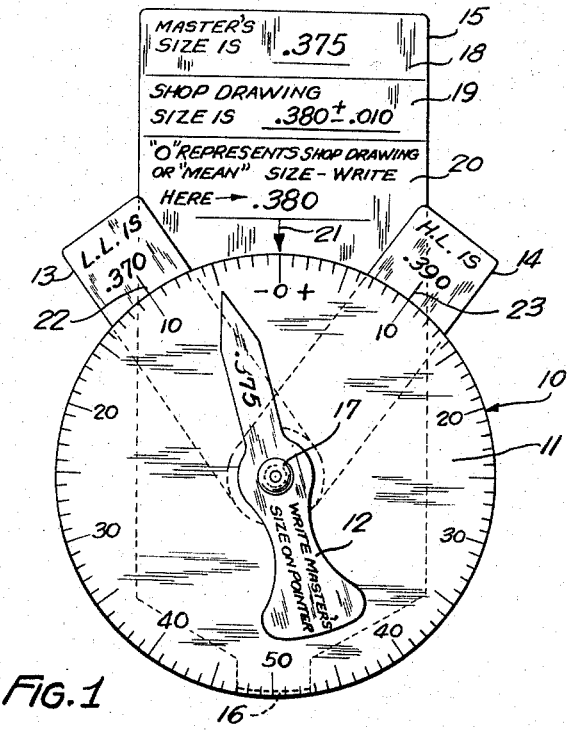

Referring to the drawing, and particularly to Fig. 1, the invention is shown as embodied in a disk-type setting indicator 10 comprising a stationary dial 11 having secured thereto a swingable pointer 12 and a pair of swingable limit tabs or arms for defining a lower limit tab 13 and a higher limit tab 14. In addition, a disk like stationary reference tab 15 is connected to dial 11 by means of a connecting strip 16. Pointer 12 is disposed upon the outer face of dial 11. Tabs 13 and 14 are interposed between interconnected dial 11 and reference tab 15. Reference tab 15 is further secured to dial 11 by means of a central pivot pin 17 along with the movable tabs 13 and 14 and swingable pointer 12.

Figure 2:
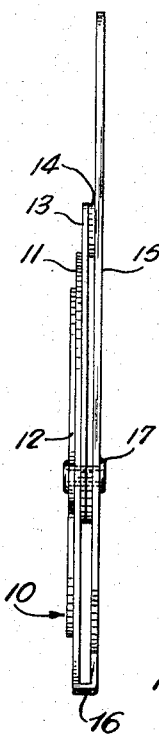
Fig. 2 is a side elevation view of the disk-type setting indicator shown in Fig. 1.

The stationary reference tab 15 is preferably made integral with the relatively stationary dial 11 at the lower portion thereof, as best seen in Fig. 2, by means of connecting strip 16; however, it is well within the concept of the invention that the dial 11 and reference tab be made immovable relative to each other by an equivalent means.

The face of the stationary dial 11 is divided into the same number of units as the dial type measuring instrument indicator face, so as to correspond therewith. Ordinarily this is done as shown in Fig. 1, by marking off the units into plus or minus 50 different equiangularly spaced marks. For example, the disk-type setting indicator 11 can show a plus or minus tolerance up to 50 units.

The swingable pointer 12 has the master gauge size noted thereon. For example, in this particular case and for purposes of illustration only, the master gauge size of .375 unit has been marked on pointer 12 in Fig. 1.

The stationary reference tab 15 has three spaces 18, 19 and 20 provided thereon for noting the master size, which is .375 unit as pointed out hereinabove, for noting the shop drawing size or rectilinear dimension which is, for illustrative purposes .380 plus or minus .010 unit, and further for noting that "0" represents shop drawing or "mean" size, respectively. The shop drawing or "mean" size of .380 unit has been marked on reference tab 15 for purposes of further illustrating the example. A reference mark 21 on reference tab 15 corresponds with the "0" mark on dial 11.

The lower limit tab 13 carries the notation of the smallest acceptable dimension of a work piece which, in this particular example is .370 unit. The higher limit tab 14 denotes the largest possible acceptable dimension of the workpiece and sets forth the dimension of .390 unit, in accordance with the subject illustrative example. Reference marks 22 and 23 appear on tabs 13 and 14, respectively.

Figure 3:
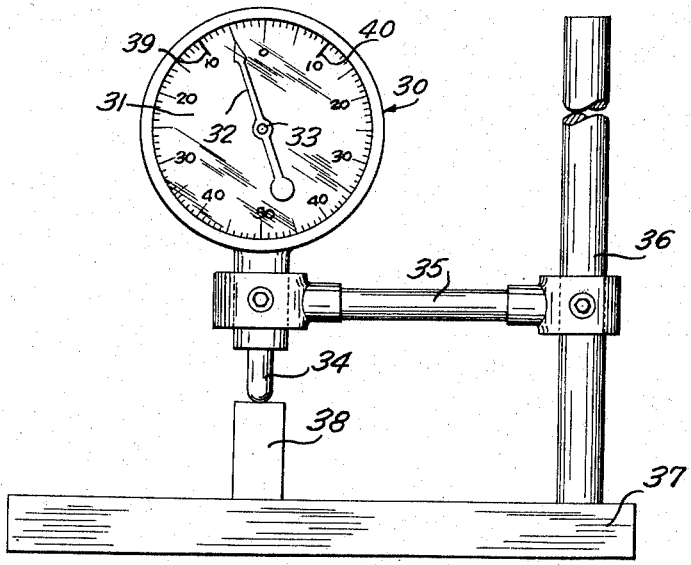
Fig. 3 is a front elevational view of a dial type measuring instrument, more specifically a dial indicator gauge, and a master block in operative position therewith.

Fig. 3 shows a dial type measuring instrument, and more particularly a dial indicator gauge 30 having a movable dial face 31. The dial face 31 carries graduations up to plus or minus 50 units and is in accordance with the face of the stationary dial 11 of the indicator device 10 in Figs. 1 and 2. A pointer 32 pivotally mounted upon a central axis 33 denotes the amount of rectilinear travel of a movable stem 34. A spring means, not shown, normally urges the spindle 34 outwardly. A gear train, not shown, interposed between the pointer 32 and spindle 34 transmits the relative movement thereof to the pointer 32. For example, as the spindle 34 is moved 5 units the pointer 32 indicates the movement on the scale by moving over 5 graduation marks in a plus or minus direction corresponding to the direction of movement of the stem 34.

The measuring instrument 30 is securely clamped within one end of a bracket arm 35 which is clamped at the other end thereof to a post 36. Post 36 is rigidly mounted in a platen or base member 37.

The workpiece or master block to be gauged or measured rests upon platen 37 and is passed directly beneath the spindle 34. In the case of a master block, such as master block 38 shown in Fig. 3, which can be a Johansson or Hoke block, for example, the master block 38 is passed between the platen 37 and the spindle 34. The pointer 32, in this particular instance, will rest minus 5 indicia to the left of absolute vertical as shown in Fig. 3 since the master block size is .375 unit in the subject example or .005 unit less than the "mean" size of .380 unit.

However, since the mean dimension is .380 unit or 5 additional units over and above the size of the master block, the pointer is placed at minus 5 units by rotating the dial face 31. In addition, the given tolerance in the example of plus or minus .010 unit requires the tabs 13 and 14 to be placed on either side of the zero datum or reference mark at the markers designated by the numeral 10 in Fig. 1.

From the foregoing description, applicant's visual aid enables the operator to calibrate the dial indicator gauge in a simple and efficient manner once the disk-type indicator shown in Figs. 1 and 2 has been prepared.

The swingable pointer 12 of the device 10, as pointed out hereinabove, corresponds to the pointer 32 of gauge 30. However, in most cases, the dial indicator gauge 30 is not equipped with tabs corresponding to the tabs 13 and 14 shown in Figs. 1 and 2. The operator either mentally notes the upper and lower tolerance or by using a pencil, may mark the upper and lower limits on the crystal of the dial type indicator 30 as indicated by reference numerals 39 and 40, respectively, in Fig. 3.

Ordinarily, a grease pencil may be used for marking the upper and lower limits in this manner.

Figure 4:
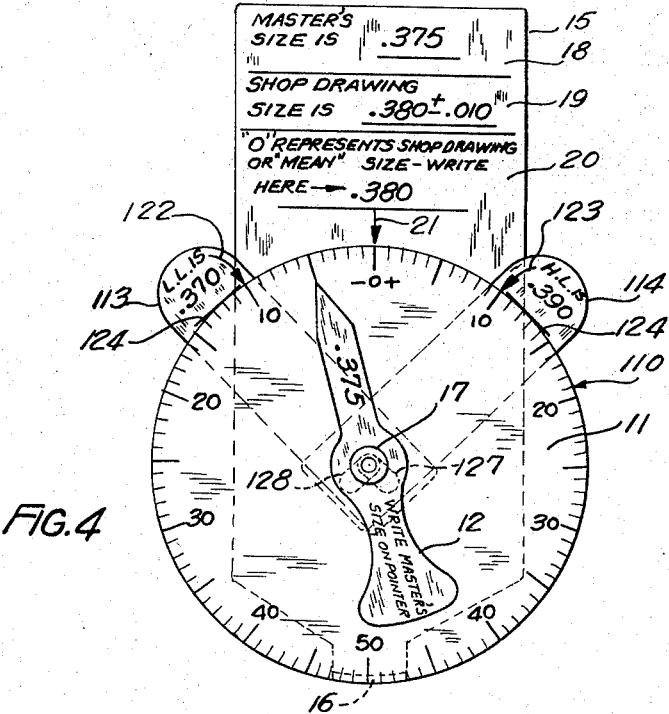
Fig. 4 shows a plan view of a modification of the present invention.
Figure 5:
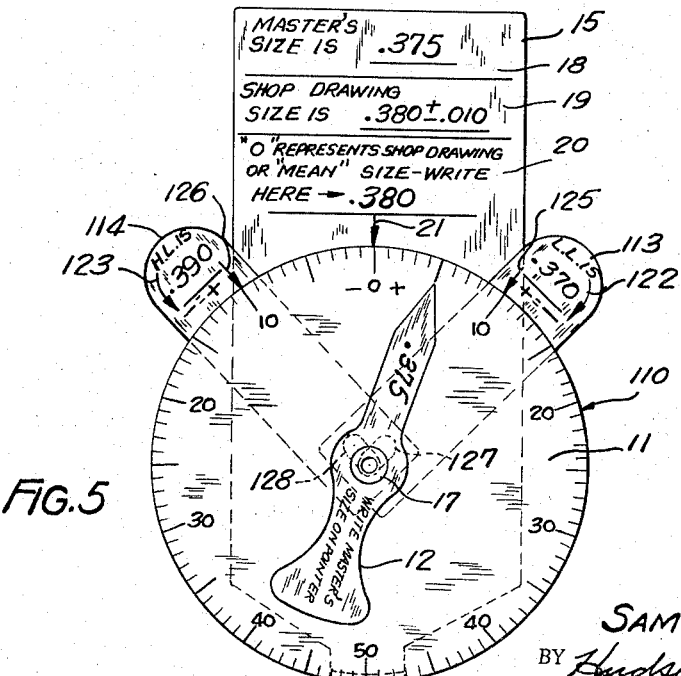
Fig. 5 is a plan view of the modification shown in Fig. 4 wherein the movable tabs are shown in another position.

A modification of the present invention is shown in Figures 4 and 5 wherein provisions have been made for adapting a disk-type indicator for use where close tolerances of an external dimension are required and also where it is desired to measure an internal dimension which may also have close tolerances required.

Referring more particularly to Figure 4 of the modification indicated generally by reference numeral 110, the disk 11 and stationary reference tab 15 are substantially identical to that disclosed in the embodiment shown in Figures 1 and 2. Also, the structure of swingable pointer 12 remains generally the same. The essential difference lies with the use of swingable tabs 113 and 114 which can be moved radially inwardly and outwardly for a reason to become more apparent hereinafter.

Using the same illustrative example set forth hereinbefore in relation to the invention illustrated in Figures 1 and 2, reference marks 122 and 123 are placed in close proximity with an outer edge of tabs 113 and 114, respectively. The rectilinear reference marks 22 and 23 shown in device 10 in Figures 1 and 2 do not appear in Figures 4 and 5. However, it is within the concept of the invention that marks 22 and 23 can also appear on the same tab together with the arcuate reference marks 122 and 123, respectively. Transverse rectilinear bars 124 appear upon swingable tabs 113 and 114 and are placed in juxtaposition with the corresponding edge portions of disk 11 where an external rectilinear dimension is being measured with an indicator gauge.

The arcuate reference marks 122 and 123 are so located that the required tolerance can be as small as .001. Accordingly, the indicator device will register the aforesaid tolerance thereon. The embodiment shown in Figures 1 and 2 does not provide for a tolerance spread of less than tab 5 indicia marks. It is conceivable, however, that the width of tabs 13 and 14 may be considerably reduced so that relatively close tolerances may be indicated on the indicator device 10.

The foregoing illustrations used in connection with Figures 1 and 2 and Figure 4 deal with measuring external or outside dimensions. When it is desired to measure internal dimensions, those skilled in the art will recognize that the plus and minus signs are reversed and become minus and plus signs, respectively. Figure 4, and more particularly Figure 5, show that the swingable and radially movable arms or tabs 113 and 114 can be moved radially outwardly by virtue of the provision of the slots 127 and 128, respectively, in the inner ends thereof. Slots 127 and 128 are elongated in a radial direction relative to the dial face 11 of the disk-type indicator 110. Thus, the pin 17 is passed through hinge slots 127 and 128 for maintaining the tabs 113 and 114 in assembly.

The low limit tab 113 when measuring internal dimensions is moved towards the right since the plus sign becomes a minus sign on dial face 31 and as indicated on tab 113. Also, in accordance with the above, high limit tab 114 is moved to the left or opposite direction for the foregoing reasons. Reference marks 125 and 126 appear on tabs 113 and 114, respectively, in close association with the outer edge thereof for measuring relatively close or minute tolerances of a rectilinear internal dimension. The marks 125 and 126 are shown in Figure 5 as being coincidental with the No. 10 indicia marks on either side of the absolute datum mark or zero indicia mark in accordance with the illustrative example.

Moreverover, the wingable pointer 12 is moved to indicate the No. 5 indicia mark to the right of the zero mark on the face of stationary dial 11, since the signs are reversed when switching from measuring an external dimension to measuring an internal dimension as hereinabove pointed out.

In accordance with the foregoing, it is obvious that the new and novel disk-type setting indicator provided by applicant may be retained and stored in a safe place for use at a later date or kept in a handy place for again effecting or checking the calibration of the dial type measuring instrument.

The new and novel dial type setting indicator may be made of a metal, paper or plastic material, and the indices, words and symbols may be embossed thereupon or made of a plastic which can be marked upon with ordinary grease pencils in order to note the pertinent dimensional data thereon.

Two forms of the disk type setting indicator have been described which can be easily and economically made and are compact and of small dimension for convenient disposition. It is to be understood, however, that the invention is not limited to these two modifications, but is susceptible of many changes or modifications. For example, the stationary reference tab 15 may be formed separately from the stationary dial 11, and I intend to cover all such inventions as shown within the claims.

Having thus described my invention, I claim:

1. A disk-type indicator as a visual aid for use with a conventional settable dial-type measuring instrument to facilitate setting of the latter in accordance with permissible tolerance variations for a given workpiece from a master workpiece dimension, comprising a disk having on the front side thereof a graduated scale extending circumferentially around the peripheral edge of the disk and corresponding with the dial scale of said instrument, a reference tab in fixed relation to said disk on the rear side of the latter and having an indicia portion extending outwardly beyond said peripheral edge substantially opposite the zero graduation of said graduated scale, master workpiece indicia on said indicia portion including an exact master dimension and permissible plus and minus tolerance variations from said exact dimension, pivot means substantially centrally of said disk, a pointer adjacent the front side of the disk and swingable on said pivot means relative to said graduated scale and corresponding with the pointer of said instrument, and a pair of limit tabs mounted on said pivot means for swinging around the full circumference of said peripheral edge and movable between the planes of said disk and reference tab, said pair of tabs having thereon plus and minus values of said permissible tolerance variations from said exact master dimension and also having indicating marks thereon for registering co-operation with the graduations of said graduated scale at points on opposite sides of said zero graduation for intercepting a sector portion of said graduated scale as representing a sector portion of the dial scale of said instrument within which the measurement reading on the instrument should fall for said given workpiece.

2. A disk-type indicator as defined in claim 1 and wherein said pair of tabs have slots therein at the point of pivotal connection with said pivot means for radial shifting of said pair of tabs relative to said disk, said pair of tabs having other indicia thereon comprising indicating marks of opposite algebraic signs from and associated with the first-mentioned tolerance variations, said other indicia being movable from behind said disk to an exposed relation in response to outward radial shifting of said pair of tabs.

References Cited in the file of this patent

UNITED STATES PATENTS

| | | |
|---|---|---|
| 598,124 | Wall | Feb. 1, 1898 |
| 823,782 | Holden | June 19, 1906 |
| 1,694,965 | Buckley | Dec. 11, 1928 |